United States Patent [19]

Braga et al.

[11] Patent Number: 5,066,700
[45] Date of Patent: Nov. 19, 1991

[54] PLASTOELASTOMERIC POLYOLEFINIC COMPOSITIONS AND PROCESS FOR PREPARING THEM ACCORDING TO DYNAMIC VULCANIZABLE METHODS

[75] Inventors: Vittorio Braga; Michele Manica, both of Ferrara; Emilio Martini, Pontecchio Marconi; Federico Milani, Maria Maddalena, all of Italy

[73] Assignee: Ausimont S.p.A., Milan, Italy

[21] Appl. No.: 529,488

[22] Filed: May 29, 1990

Related U.S. Application Data

[62] Division of Ser. No. 406,971, Sep. 13, 1989, Pat. No. 4,963,612.

[30] Foreign Application Priority Data

Sep. 13, 1988 [IT] Italy .............................. 21906 A/88

[51] Int. Cl.$^5$ .............................................. C08C 5/05
[52] U.S. Cl. ...................................... 524/380; 524/390; 524/392; 524/477; 524/484; 525/240; 525/263
[58] Field of Search ................... 524/477, 380, 484; 525/263, 141, 240

[56] References Cited

U.S. PATENT DOCUMENTS

| | | | |
|---|---|---|---|
| 3,301,837 | 1/1967 | Bartorelli | 525/375 |
| 4,477,631 | 10/1984 | Danesi et al. | 525/141 |
| 4,707,519 | 11/1987 | Forti et al. | 525/141 |
| 4,835,204 | 5/1989 | Garfanini | 524/291 |

*Primary Examiner*—Joseph L. Schofer
*Assistant Examiner*—M. Sweet
*Attorney, Agent, or Firm*—Stevens, Davis, Miller & Mosher

[57] ABSTRACT

This invention relates to plastoelastomeric polyolefinic compositions comprising an intimate mixture of the following components, in the indicated percentages by weight:

A) 10-50% of non cross-linked polypropylene;
B) 2-10% of ethylene/propylene/(diene)non cross-linked elastomeric copolymer,
C) 30-40% of polymeric product which is insoluble in xylene at 135° C., comprising polypropylene and ethylene/propylene/(diene) copolymer, and
D) 5-58% of an extender oil.

This invention also relates to a process for preparing the above compositions, which consists in subjecting to vulcanization under dynamic conditions a mixture comprising, in % by weight:

A) 20-80% of polypropylene,
B) 80-20% of ethylene/propylene/(diene) elastomeric copolymer,
C) 0.1-10%, referred to such copolymer, of a peroxide,
D) 5-60%, referred to such peroxide, of a furan derivative as a cross-linking coadjuvant.

and in adding, after vulcanization, the extender oil in an amount ranging from 6 to 100% calculated on the vulcanized product.

5 Claims, No Drawings

PLASTOELASTOMERIC POLYOLEFINIC COMPOSITIONS AND PROCESS FOR PREPARING THEM ACCORDING TO DYNAMIC VULCANIZABLE METHODS

This is a division of application Ser. No. 406,971, filed Sept. 13, 1989, now U.S. Pat. No. 4,963,612.

FIELD OF THE INVENTION

The present invention relates to a plastoelastomeric polyolefinic compositions, consisting of mixes of at least partially vulcanized EP or EPDM rubber with at least an olefinic plastomeric thermoplastic polymer, and obtained by dynamic vulcanization of the corresponding mixes containing the rubber in the non-vulcanized state.

BACKGROUND OF THE INVENTION

The preparation of compositions based on thermoplastic polymers and vulcanized rubbers using a dynamic vulcanization method is known in the art and is decribed in particular in U.S. Pat. Nos. 3,578,643; 3,862,106; 3,037,954 and 3,806,558.

According to this method, vulcanization of the elastomeric component is made to occur during the step of mixing or mastication with a plastomeric polymer in the molten state, using cross-linking agents, which are usually of the conventional type, such as e.g. peroxides, azide compounds, mixtures of sulphur with zinc oxide, substituted ureas, thiocarbamates, etc. If in the so-treated mixture there is a sufficient amount of plastomeric polymer, the composition, on conclusion of the vulcanization of the elastomeric component, retains good processability characteristics in hot conditions also if it contains high proportions of vulcanized elastomer.

According to French patent No. 2,408,632, polyolefinic plastoelastomeric compositions are obtained using dynamic vulcanization methods. These utilize, as a cross-linking agent, a halogenated phenolic resin, or a phenolic resin which are not halogenated but are associated with halogen donors, in combination with a metal oxide (activator).

According to the patent, the mix of EPDM rubber and olefinic polymer, wherein the phenolic resin content ranges from 5 to 20% for the rubber, is subjected to mastication at a temperature sufficient to melt the olefinic polymer. Then the activator is added and mastication is continued at a temperature at which the elastomeric component cross-linking occurs. The metal oxide, in particular the zinc oxide, favors in this case the complete cross-linking of the elastomer, which is one of the objects of the process of the patent.

Generally, the products obtained according to the above-cited processes exhibit good elastomeric characteristics at room temperature. However, these characteristics, in particular the compression set values, decay as the temperature rises, which jeopardizes the practical utilization of the products above the melting point of the plastomer.

It is further known from U.S. Pat. No. 3,957,979 to prepare thermoplastic elastomers by subjecting a blend of an EPDM interpolymer with polypropylene and substantial amounts of polyethylene to a cross-linking reaction using free radical generating agents, while submitted to hot working.

According to the preparation, polyethylene is preferentially cross-linked and grafted to the EPDM interpolymer, thereby protecting polypropylene from radical attack, degradation and cross-linking or grafting reactions. The product thus obtained possesses improved molding characteristics, but exceedingly loose elastic properties such as elongation as break tension set and compression set, especially at high temperatures.

The above references are hereby incorporated by reference.

DETAILED DESCRIPTION OF THE INVENTION

Applicant has now found polyolefinic plastoelastomeric compositions, which, besides exhibiting an excellent processability in hot conditions and having general characteristics comparable with the ones of the best plastoelastomeric compositions of the prior art, are endowed, regarding those compositions, with better elastic characteristics at high temperatures.

The compositions, which represent one of the objects of the present invention, comprise an intimate mixture of the following components, in the indicated percentages by weight, referred to the whole mixture:

A) 10–50%, but preferably 20–30%, of non cross-linked polypropylene,

B) 2–10%, but preferably 5–10%, of an ethylene/propylene elastomeric non cross-linked copolymer, or of an ethylene/propylene/diene elastomeric non cross-linked terpolymer, C) 30–45%, but preferably 35–40%, of a polymeric product which is insoluble in xylene at a temperature of 135° C., comprising polypropylene and ethylene/propylene copolymer or ethylene/propylene/diene terpolymer, D) 5–58%, but preferably 10–50%, of an extender oil.

Optionally, cross-linked or non cross-linked polyethylene can be present in the composition in amounts lower than 4% by weight on the weight of the polymer composition.

The above-specified compositions may optionally contain also inorganic and/or organic non polymeric products such as ZnO, $SiO_2$, $TiO_2$, kaolin, carbon black, stabilizers, anti-ageing agents, catalysts, accelerators, cross-linking coadjuvants or decomposition products thereof.

The polypropylene as per point (A) may be a homopolymer, or a copolymer of propylene with up to 10% by weight of copolymerized ethylene.

The copolymers and terpolymers defined at point (B) may contain from 25 to 60% by weight, but preferably from 30 to 45% by weight, of propylene, and from 0 to 5% by weight of units deriving from one or more conjugated or non-conjugated dienic monomers, such as for example, indene, 1,3-butadiene, 1,4-hexadiene, norbornadiene, ethylidenenorbornene, cyclcopentadiene.

They are preparable by copolymerization of monomers carried out in the presence of Ziegler catalysts, according to the methods known in the art. Examples of Ziegler catalysts are the catalysts prepared by contacting a compound of a metal belonging to group IVa, Va, VIa or VIIa of the Mendelejeff periodic system, such as e.g. a Ti, V or Cr halide with organometallic compounds of a metal of group I, II or III of the periodic table of the elements containing at least a metal-carbon bond, alkyls such as e.g. Al alkyls and Al alkyl halides.

If the molecular weight of the elastomeric copolymer or terpolymer exhibits a rather high value, corresponding to /η/values higher than 3.5 dl/g, of particular advantage for the compositions of the invention have proved to be those copolymers and terpolymers, the macromolecular structure of which is substantially free from head-to-head, tail-to-tail inversions of the propylenic unit.

It is known in this connection that propylene can enter the polymeric chain according to primary or secondary insertions, as is described for example by I. Pasquon and U. Giannini in "Catalysts Science & Technology" vol. 6, pages 65–159, J. R. Anderson & N. Doudart, Springer Verlag, Berlin (1984), hereby incorporated by reference.

"Propylene enchainment inversion" means the insertion variation (from primary to secondary) that the propylene molecule may exhibit in the macromolecule.

Method for determining the distribution of the ethylene-propylene sequences, and in particular the absence of the above-mentioned invention in the ethylene-propylene copolymers, are known in the literature. The methods include well defined modalities for qualitative and quantitative analyses, based on the Nuclear Magnetic Resonance of $^{13}C$, according to what is described for example by J. C. Randall in "Polymer sequence determination by C 13-NMR method" (Academic Press, N.Y. 1977) and in "Macromolecules," 11, 33, (1978), or by H. N. Cheng in "Macromolecules," 17, 1950 (1984) or by C. J. Charman et al in "Macromolecules," 10, 536 (1977), all hereby incorporated by reference. Such modalities are transferable also to ethylene/propylene/diene terpolymers, in which diene is present in relatively low amounts, generally lower than 10% by weight.

The ethylene-propylene copolymers and ethylene-propylene-(conjugated or non-conjugated) diene terpolymers, the macromolecules of which are substantially free from propylene enchainment inversions, are characterized by very low absorption values in the 13C-NMR spectrum (obtained in orthodichlorobenzene solution at a temperature of 120° C., using dimethyl sulphoxide (DMSO) as a reference) at about 34.9, 35.7 and 27.9 ppm (chemical shift, referred to tetramethylsilane (TMS)=0). These are typical of the presence of sequences of the type:

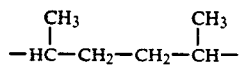

(head-to-head inversion or tail-to-tail inversion of type $X_2$) and of the type:

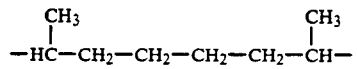

(head-to-head inversion or tail-to-tail inversion of type $X_4$).

The substantial absence of propylene enchainment inversions in such copolymers and terpolymers is apparent from the fact that at least one of the two parameters $X_2$ and $X_4$, and preferably both, exhibits a value equal to or lower than 0.02.

As is known, parameters $X_2$ and $X_4$ represent the fraction of methylene sequences, having 2 and 4 uninterrupted methylene groups between two consecutive methyl or methine groups in the polymeric chain, regarding the total of uninterrupted methylene sequences determined by $^{13}C$ NMR. The value of the fraction is calculated according to the method described by J. C. Randall in "Macromolecules" 11, 33 (1978).

Copolymers and terpolymers endowed with such characteristics are known. They are preparable by polymerization of the corresponding monomer mixtures in the presence of Ziegler catalysts based on titanium compounds optionally carried on magnesium halide, and on aluminum organometal compounds. Catalysts of this kind are described for example in U.S. Pat. No. 4,013,823, in published European patent application No. 202,550, U.S. Pat. No. 4,860,440 in Italian patent No. 117,340 and in Italian patent applications Nos. 20,203 A/81, 20,386 A/85, 21,872 A/86, 21,510 A/87 in the name of the applicant hereof, all hereby incorporated by reference.

The polymeric product, which is insoluble in xylene at 135° C. and which constitutes component (C) of the compositions according to the invention, substantially comprises the products derived from the cross-linking of components (A) and (B), and possibly the grafting products of components (A) and (B), either cross-linked or not cross-linked, the ones on the others.

Generally, the polypropylene content in the component (C) ranges from 5 to 20% and preferably from 10 to 15% by weight referred to the weight of the whole composition.

Component (D) consists of an oil of the type which is usually utilized to carry out the extension of rubbers in general, and it can be an aromatic, naphthenic or, preferably, paraffinic oil.

Generally, in the pastoelastomeric compositions of the invention the elastomeric phase appears to be dispersed in the continuous plastomeric phase in the form of particles of sizes not greater than 10 microns, with at least 50% thereof having a size lower than 5 microns.

The plastoelastomeric compositions, which are one of the objects of the present invention, are preparable by subjecting to mastication or to other shearing stresses, in the presence of a peroxide cross-linking agent and of particular cross-linking coadjuvants, as defined hereinafter, a polymeric mixture comprising from 20 to 80% by weight, but preferably from 60 to 25% by weight of polypropylene and from 80 to 20% by weight, but preferably from 40 to 75% by weight of an ethylene-propylene elastomeric copolymer or of an ethylene-propylene-diene elastomeric terpolymer, at a temperature which is sufficient to melt the polypropylene and at which the cross-linking of about 50–85% by weight of the starting elastomer amount occurs.

Optionally, amounts of polyethylene lower than 4% by weight on the weight of the polymeric mixture can be present therein.

Whenever used herein, the term "cross-linking", as referred to the starting elastomer, comprises both the actual cross-linking or vulcanization reaction of the elastomer. The reaction which may lead to the grafting of the cross-linked or non cross-linked elastomer on the polypropylene (or plastomeric phase) as a consequence of the reaction promoted by the cross-linking system utilized.

As cross-linking agents, use is made of organic peroxides, preferably of those which exhibit a halving time of 10–200 seconds at a temperature ranging from 100° C. to 240° C., at which the vulcanization reaction is made to occur.

Examples of the peroxides are dicumyl peroxide, $\alpha,\alpha'$bis(t.butylperoxy)-m- and/or -p-diisopropylbenzene, and 1,1-di-t.butylperoxide-3,5,5-trimethylcyclohexane.

The peroxide amount utilized in the vulcanization generally ranges from 0.1 to 10% by weight, but preferably from 0.2 to 5% by weight calculated on the elastomeric component.

To the vulcanization system to be utilized in the preparation of the compositions according to the invention belong, along with the above peroxides, also coadjuvants consisting of furan derivatives comprised in one of the following general formulas:

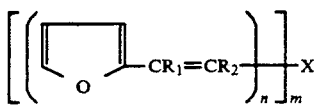
(I)

where: X is a radical of formula: —CHO, —COOH, —CONH$_2$, —CN, —NO$_2$, —COOCO—, COOR, —CO—, —CH$_2$COCH$_2$COOR, CH(COOR)$_2$, where R is an aryl containing 6 to 8 carbon atoms, or an alkyl containing 1 to 4 carbon atoms, R$_1$, R$_2$ equal to, or different from each other, can be H or C$_1$–C$_3$ alkyl, n=1 or 2, m=a number equal to the free valence of X,

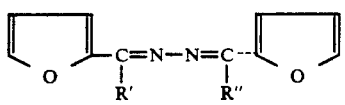
(II)

where R' and R", like or different from each other, may be hydrogen, or alkyl radicals containing from 1 to 4 C, or cycloalkyl radicals containing from 5 to 8 C and preferably from 6 to 8 C:

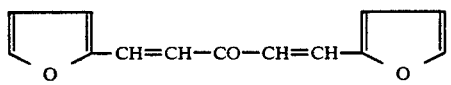
(III)

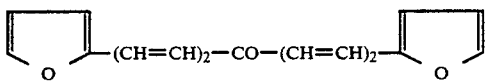
(IV)

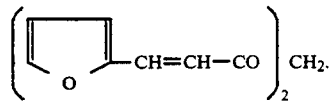
(V)

The coadjuvants are utilized in amounts corresponding to about 5–60% by weight, but preferably to about 10–30% by weight for the utilized peroxide.

Examples of furan derivatives according to formulas (I) and (II) utilizable for the purposes of the present invention are 1,5-difurfuryl-1,4-pentadiene-3-one and difurfuralaldazine.

Further examples are β-(alpha-furyl)-acrolein; 5-alpha-furyl)-pentadienal; β-(alpha-furyl)acrylamide; β-(alpha-furyl)acrylonitrile; β-(alpha-furyl) acrylic acid and esters thereof; bis-furfuryldene acetone; alpha-ethyl-β-(alpha) acrolein; the esters of the furfurylidene malonic acid. The products obtained from the condensation of -(alpha-furyl acrolein) with cyclic ketones are described in "Berichte," 76, 676 (1943), hereby incorporated by reference.

The above compounds are known in the art. They are preparable, for example, according to what is described in U.S. Pat. No. 3,301,837.

Thus, another object of the present invention is a process for preparing plastoelastomeric polyolefinic compositions, which comprises, in order, the following operative steps:

1) preparing an intimate mixture, comprising, in % by weight:
   a) from 20 to 80%, but preferably from 60 to 25% of polypropylene or of a copolymer of propylene with up to 10% by weight of ethylene;
   b) from 80 to 20%, but preferably from 75 to 40% of an ethylene-propylene elastomeric copolymer or ethylene-propylene-diene elastomeric terpolymer;
   c) from 0.1 to 10%, calculated on the elastomeric copolymer or terpolymer, of an organic peroxide as a vulcanizing agent;
   d) from 5 to 60%, calculated on the organic peroxide, of at least a compound comprised in one of preceding formulas (I) and (II), as a vulcanization coadjuvant; and
   e) optionally, an amount lower than 4% on the total polymeric products of polyethylene.
2) heating the mixture, during the mixing step or during the mastication step or during the step in which it is subjected to other shearing stresses, to a temperature ranging from 160° C. to 240° C., wherefore melting of the polypropylene and cross-linking of about 50–85% by weight of the originally present elastomeric copolymer or terpolymer take place;
3) adding to the resulting product, by means of intimate mixing, a paraffin extender oil in an amount ranging from 6 to 100 parts by weight and preferably from 20 to 80 parts by weight for 100 parts of the product.

The mixture elastomeric product specified under (b) contains from 25 to 60%, preferably from 30 to 45% by weight of copolymerized propylene, and from 0 to 5% by weight of units deriving from one or more conjugated or non-conjugated dienic monomers as mentioned hereinbefore. It may have a molecular weight corresponding to /η/ values ranging from 2 to 8 dl/g, but preferably ranging from 3 to 5 dl/g, extremes included.

If the molecular weight of the elastomeric component corresponds to /η/ values higher that 3/5 dl/g, such component is preferably selected from ethylene/propylene/(diene) copolymers and terpolymers, in the structure of which head-to-head, tail-to-tail inversions of the propylenic unit, as mentioned hereinafter, are substantially missing. More advantageously, the copolymers and terpolymers are selected from the one which exhibit values of the R$_1$×R$_2$ product higher than 2, and a wide distribution of the molecular weights expressed by values of the Mw/Mn ratio equal at least to 6, and preferably ranging from 10 to 15. The R$_1$×R$_2$ represents, as is known, the product between the reactivity ratios of ethylene (R$_1$) and of propylene (R$_2$). The product is calculated from the sequence distribution in such copolymers and terpolymers through $^{13}$C NMR analysis, according to known methods.

To practice the process of the invention it is possible to use, instead of the individual components (a) and (b) of the mixture, an intimate mixture of polypropylene and of elastomeric ethylene-propylene copolymer or elastomeric ethylene-propylene-diene terpolymers, as is obtainable in a single polymerization step of the monomers by polymerizing for example, according to U.S. Pat. No. 4,399,054, hereby incorporated by reference, first the propylene up to the desired amount and subsequently a mixture of ethylene and propylene, optionally containing the dienic monomer, in the proper ratio.

To the mixture so obtained, the vulcanization components as defined under (c) and (d) will be subsequently added.

Other vulcanization co-agents or coadjuvants (for example liquid polybutadiene, triallyl cyanurate) besides thermal stabilizers, antioxidants, mineral fillers, dyes, may be added to the mixture of reaction components from (a) to (d) cited above.

In the range of the operative conditions illustrated hereinbefore, by varying, according to techniques accessible to those skilled in the art, the amounts of the reagents and of the components of the polymeric mixture, it is possible to obtain, after cross-linking, products having higher or lower quantitative ratios between components (A), (B) and (C) as defined above. In particular, the use of higher amounts of coadjuvants permits to obtain higher amounts of cross-linked polypropylene. In particular, to the vulcanized compositions coming from operative step (2) it is possible to add variable amounts of polypropylene as is defined in (A), for example, to correct the product hardness.

Generally, the propylene amount belonging to the product, which is insoluble in xylene at 135° C., accounts for 20 to 70%, preferably from 30 to 50% by weight of the polypropylene contained in the starting mixture subjected to cross-linking.

The elastomeric copolymer or terpolymer belonging to the insoluble product amounts to 50-85%, but preferably to 70-85% by weight of the copolymer or terpolymer contained in the starting mixture.

EXAMPLES

The following examples are given to better illustrate the present invention, without being, however, a limitation thereof.

EXAMPLE 1

In a Banbury internal mixer there were intimately mixed for 5 minutes, at a temperature gradually rising from 80° to 180° C., 26 parts by weight (p.w) of homopolymer polypropylene having a M.I. (230° C., 2.16 kg)=1 and a I.I.=92%, with 74 parts by weight (p.w.) of an ethylene/propylene copolymer, containing 38% by weight of copolymerized propylene, obtained by bulk polymerization of the monomers at 40° C., using a titanium catalyst similar to the one described in example 1 of European patent application No. 262,987, U.S. Pat. No. 4,904,077 hereby incorporated by reference, and Al triisobutyl as a co-catalyst. Such copolymer exhibited the following characteristics:

head-to-head, tail-to-tail inversions of the propylene unit substantially absent ($X_2=X_4=0.018\%$);
$R_1 \times R_2 = 8$;
$Mw/Mn = 11$;
$/\eta/ = 3.8$ dl/g.

The mixture was then discharged and granulated by using a Bandera single-screw extruder. The granules were then sent to a laboratory two-screw extruder produced by A.P.V. having a length/diameter (L/D) ratio equal to 25 and a diameter of 127 mm, equipped with conveyance and masticating elements, by means of which a residence time of 60 seconds was obtained, and which was operating at a temperature from 160° C. to 240° C. 2% by weight of Peroximon F40 (terbutyl-peroxide-diisopropyl benzene) and 0.37% by weight of di-furfural-aldazine, referred to the polypropylene/elastomer mixture, were simultaneously conveyed into the extruder.

At about ⅔ of the extruder length, the elastomer cross-linking reaction was concluded. At such extruder point, 20 p.w. of polypropylene of the same type as the starting polypropylene, 3 p.w. of ZnO, 0.5 p.w. of mercaptobenzoimidazole and 0.2 p.w. of polymerized 2,2,4-triethyl-1,2-dihydroquinone, then 74 p.w. of paraffin extender oil, preheated to 200° C., were added. The mix was then discharged from the extruder into a second single-screw extruder (L/D=8, D=20 mm), where it was compacted, degassed, further homogenized and sent to a liquid-ring top cutting unit for being transformed into pellets.

The resulting product was subjected, in order, to the following analysis procedures:

1) Extraction with xylene at 135° C. for 5 hours and separation of the residue by filtration from the resulting solution, using a Gooch heated-wall filter.
2) Determination of the polypropylene amount present in such residue by means of infrared analysis and, by difference, of the amount of cross-linked copolymer or terpolymer.
3) Determination, in the solution obtained from the above-mentioned extraction, of the content of polypropylene as such (non cross-linked and non grafted on the elastomeric component) by cooling of such solution, wherefore precipitation of polypropylene occured, which was filtered at 23° C. and washed with xylene at 23° C.
4) Determination of the content of non cross-linked elastomeric copolymer and terpolymer, carried out by coagulating with acetone the xylene solution deriving from the separation of polypropylene as such, according to procedure 3), and by separating the coagulated product.
5) Determination of the paraffin oil content carried out by evaporating under vacuum the acetone/xylene mixture deriving from procedure (4).

The analysis gave the following results, expressed in % by weight on the thermoplastic composition:

| | |
|---|---|
| non cross-linked elastomeric copolymer | 7% |
| polypropylene as such | 15% |
| residue insoluble in xylene at 135° C. | 38% |
| polypropylene contained in the insoluble residue (on the total of the composition) | 8% |
| extender oil | 37% |

The characteristics of the obtained product, determined on specimens obtained in an injection molding press, were as follows:

| | | |
|---|---|---|
| SHORE hardness A | 70 | (ISO 868) |
| Tensile strength (kg/cm$^2$) | 75 | (ISO 37) |
| Elongation at break (%) | 350 | (ISO 37) |
| Compression set (10 h at 170° C.) (%) | 55 | (ISO 815). |

In the obtained composition, the elastomeric phase appears to be highly dispersed with particle size lower than 10 microns, at least 50% thereof having a size lower than 5 microns.

EXAMPLE 2

It was operated as is described in the preceding example, using polypropylene and ethylene/propylene copolymer in the form of a product directly obtained by polymerization carried out according to the following modalities. A 20 l autoclave, equipped with proper instruments and containing 13 l of n.pentane, was fed, at a temperature of 20° C., with 0.26 g of a catalyst based on $MgCl_2$ and $TiCl_4$, having spheroidal shape and prepared according to example 1 described in U.S. Pat. No. 4,399,054, along with 21.6 g of Al (isobutyl)$_3$.

The autoclave was brought to a temperature of 60° C. and propylene, withdrawn from a proper cylinder thermoregulated at 40° C., was introduced under stirring up to a pressure of 3.5 atm. While maintaining both constant temperature and pressure, propylene was fed till about 1300 g of polypropylene were produced. Degassing was then carried out to remove the solvent and the unreacted propylene, bringing the temperature in the autoclave again to 20° C. While maintaining the polymer mass under stirring and operating at a temperature of 20° C., the autoclave was fed with a 50/50 by weight mixture of ethylene/propylene withdrawn from cylinders thermoregulated at 40° C., till a pressure of 9.5 atm. was reached. Controlling the cylinder weight loss, about 3,730 g of ethylene/propylene copolymer in the gaseous phase were so produced in 4.5 hours. After gradual degassing to remove the unreacted monomers, the autoclave was opened and 5,030 g of spheroidal polymer were discharged therefrom. The polymer so obtained has a propylene content equal to 54% and a $/\eta/$ equal to 3.7 dl/g. The copolymeric component of such mix consisted of an ethylene/propylene copolymer containing 38% by weight of copolymerized propylene having the following characteristics:

head-to-head, tail-to-tail enchainment of propylene =
substantially absent ($X_2 = X_4 = 0.019$),
$R_1 \times R_2 = 8.5$,
Mw/Mn = 12,
$/\eta/ = 3.8$ dl/g.

The synthesis product was converted to pellets using a head-cut single-screw extruder, to facilitate the product feeding to the APV extruder of the preceding example.

The test was conducted as is described in example 1 as regards both the arrangement in the APV extruder and the addition of cross-linking agents, co-agents, polypropylene and extender oil.

The analyses of the resulting product gave the following results:

| | |
|---|---|
| elastomeric non cross-linked copolymer | 6% |
| polypropylene as such | 16% |
| residue insoluble to extraction in xylene at 135° C. | 37% |
| polypropylene content in the insoluble residue | 9% (on the total) |
| extender oil | 38% |

The product characteristics determined on test pieces obtained in an injection press, according to the ISO standards indicated hereinabove, were as follows:

| | |
|---|---|
| SHORE hardness | 69 |
| Tensile strength (MPa) | 7.4 |
| Elongation at break (%) | 360 |
| Compression set (10 h at 170° C.) (%) | 57 |

The particle size of the dispersed elastomeric phase turned out to be lower than 10 microns, with at least 50% of the particles having a size lower than 5 microns.

EXAMPLE 3

It was operated under the same conditions as in example 1 and with the same reagent amounts, but using an ethylene/propylene copolymer containing 38% by weight of propylene, prepared by means of a homogeneous catalyst system based on $VOCl_3$ and $Al_2(C_2H_5)_3Cl_3$, as is described in example 1 of Italian patent No. 866,519, U.S. Pat. No. 4,716,584, hereby incorporated by reference. Such copolymer exhibited the following characteristics:
$R_1 \times R_2 = 0.5$; Mw/Mn = 3;
head-to-head inversions, tail-to-tail inversions of the
  propylene unit expressed by values of $X_2 = X_4 = 0.05$;
$/\eta/ = 2.7$ dl/g.

The analysis of the obtained product gave the following results, expressed as % by weight:

| | |
|---|---|
| elastomeric non cross-linked copolymer | 4% |
| polypropylene as such | 20% |
| residue insoluble in xylene at 135° C. | 36% |
| polypropylene content in the insoluble residue | 5% (on the total) |
| extender oil | 37% |

The characteristics of the obtained product, determined on test pieces in an injection press according to the ISO standards indicated hereinabove, were as follows:

| | |
|---|---|
| SHORE hardness A | 69 |
| Tensile strength (MPa) | 8.0 |
| Elongation at break (%) | 400 |
| Compression set (10 h at 170° C.) (%) | 70 |

The size of 5 of the dispersed elastomeric particles was lower than 10 microns.

EXAMPLE 4

It was operated as in example 1 with the exception that a paraffin extender oil was incorporated into the ethylene/propylene copolymer upon mixing with polypropylene.

The obtained product exhibited the following characteristics:

| | |
|---|---|
| elastomeric non cross-linked copolymer | 22% |
| polypropylene as such | 19% |
| residue insoluble in xylene at 135° C. after a 5-hour extraction | 16% |
| polypropylene contained in the insoluble residue | 4% (on the total) |
| extender oil | 40% |

The characteristics of the obtained product, determined on test pieces in an injection press according to the above-indicated ISO standards were as follows:

| | |
|---|---|
| SHORE hardness A | 67 |
| Tensile strength (MPa) | 3.5 |
| Elongation at break (%) | 250 |
| Compression set (10 h at 170° C.) (%) | 72 |

EXAMPLE 5

It was operated as in example 1, using an ethylene/propylene copolymer containing 47% by weight of copolymerized propylene, obtained by operating with a titanium catalyst similar to the one of example 7 of European patent application No. 262,987, U.S. Pat. No. 4,904,077, hereby incorporated by reference, and with Al triisobutyl as co-catalyst, and having the following characteristics:

head-to-head inversions, tail-to-tail inversions of the propylene unit expressed by values of $X_2=0.02$; $X_4=0.05$;
$R_1 \times R_2 = 9$;
$Mw/Mn = 11$;
$/\eta/ = 3.5$ dl/g, and using, as cross-linking coadjuvant, 1.5-difurfuryl-1,4-pentadien-3-one in an amount equal to 0.3% by weight referred to the mix of the two polymers.

The analysis of the obtained product gave the following results expressed as % by weight of the thermoplastic composition:

| | |
|---|---|
| elastomeric non cross-linked copolymer | 8% |
| residue insoluble in xylene at 135° C. after a 5-hour extraction | 36% |
| polypropylene as such | 16% |
| polypropylene contained in the insoluble residue | 7% (on the total) |
| extender oil | 37% |

The characteristics of the obtained product, determined on test pieces in an injection press were as follows:

| | |
|---|---|
| SHORE hardness A | 60 |
| Tensile strength (MPa) | 7.0 |
| Elongation at break (%) | 370 |
| Compression set (10 h at 170° C.) (%) | 57 |

The size of the dispersed elastomeric particles turned out to be lower than 10 microns, at least 50% of the particles having a size lower than 5 microns.

EXAMPLE 6

It was operated as in the preceding example, but substituting the mix of propylene and ethylene/propylene copolymer prepared by mixing in a Banbuty mixer, by a product directly obtained by reaction according to the following modalities:

0.31 g of a catalyst based on $MgCl_2$ and $TiCl_4$, having a spheroidal shape and prepared according to example 1 described in U.S. Pat. No. 4,399,054, along with 259 g of $Al(isoBu)_3$ were introduced at a temperature of 20° C. into a 20-liter autoclave properly equipped with instruments and containing 13 l of n.pentane. The autoclave was brought at a temperature of 60° C. and propylene, withdrawn from a proper cylinder thermoregulated at 40° C., was introduced, under stirring, up to a pressure of 3.5 atm. While temperature and pressure were maintained constant, propylene was fed until about 1450 g of polypropylene were produced. Then it was degassed to remove the solvent and the unreacted propylene, bringing the temperature in the autoclave again to 20° C. While maintaining the polymer mass under stirring and operating at a temperature of 20° C., a $C_2-C_3$ mixture (40/60 by weight), withdrawn from cylinders thermoregulated at 40° C., was introduced into the autoclave until reaching a pressure of 9.5 atm. Checking the cylinder weight loss, about 3,850 g of polmer were produced in 4.5 h in gaseous phase. It was gradually degassed to remove the unreacted monomers and the autoclave was opened, from which 5,300 g of polymer in spheroidal shape were discharged.

The polymer so obtained had a propylene content equal to 60.5% by weight. The copolymeric component of the product so obtained was composed of an ethylene/propylene copolymer having a propylene content of 47% and exhibiting the following characteristics:

head-to-head inversions, tail-to-tail inversions of the propylene: substantially absent ($X_2 = X_4 = 0.018$)
$R_1 \times R_2 = 7$;
$Mw/Mn = 10$;
$/\eta/ = 3.8$ dl/g, The synthesis product was transformed to pellets by means of a head-cut, single screw extruder, to favor the feeding to the APV extruder.

The test was conducted as is described in example 5 for both the APV extruder and the addition of cross-linking agents, co-agents, polypropylene and oil.

The analysis gave the following results, expressed in % by weight of the thermoplastic composition:

| | |
|---|---|
| non cross-linked elastomeric copolymer | 8% |
| polypropylene as such | 15% |
| residue insoluble to the extraction in xylene at 135° C. | 36% |
| polypropylene content in the insoluble residue | 8% (on the total) |
| extender oil | 38% |

The characteristics of the obtained product, determined on test pieces produced by injection molding were as follows:

| | |
|---|---|
| SHORE hardness A | 69 |
| Tensile strength (MPa) | 6.8 |
| Elongation at break (%) | 380 |
| Compression set (10 h at 170° C.) (%) | 58 |

The dispersed elastomeric particle size was lower than 10 microns, with more than 50% of the particles having a size lower than 5 microns.

EXAMPLE 7

Operating under the same conditions as in example 5 and with the same component amounts but using an ethylene/propylene copolymer containing 40% of propylene, prepared using a catalyst composed of $VOCl_3$ and Al-triisobutyl, following the modalities described in example 3, and having the following characteristics:

$R_1 \times R_2 = 4$; $Mw/Mn = 5$;
head-to-head, tail-to-tail inversions of the propylene unit expressed by $X_2 = 0.13$, $X_4 = 0.06$;
$/\eta/ = 3.2$ dl/g, a composition was obtained, which, after cross-linking, was subjected to analysis and revealed the following composition:

| | |
|---|---|
| non cross-linked elastomeric copolymer | 5% |
| polypropylene as such | 19% |
| residue insoluble to the extraction in xylene at 135° C. | 35% |
| polypropylene content in the insoluble residue | 5.8% (on the total) |
| extender oil | 39% |

The characteristics of the resulting product, test pieces produced by injection molding process, were as follows:

| | |
|---|---|
| SHORE hardness A | 68 |
| Tensile strength (MPa) | 6.7 |
| Elongation at break (%) | 410 |
| Compression set (10 h at 170° C.) (%) | 71 |

The dispersed elastomeric particle size was not higher than 10 microns, with at least 50% of the particles having a size lower than 5 microns.

EXAMPLE 8

Example 5 was repeated, with the only difference that an ethylene/propylene/1,4-butadiene terpolymer prepared by means of a Ti-catalyst similar to the one described in example 1 of Italian patent application No. 21,510 A/87 in the name of the Applicant hereof, was utilized as an elastomeric component, using aluminum triisobutyl as a co-catalyst, and having the following characteristics:

propylene = 46% by weight
1,4-butadiene = 1.5% by weight
head-to-head, tail-to-tail inversions expressed by $X_2 = 0.018$ and by $X_4 = 0.008$
$Mw/Mn = 9$
$/\eta/ = 3.7$ dl/g.

The analysis of the composition, carried out after the cross-linking, gave the following results:

| | |
|---|---|
| non cross-linked elastomeric copolymer | 6% |
| polypropylene as such | 13% |
| residue insoluble to the extraction in xylene at 135° C. after 5 hours | 40% |
| polypropylene content in the insoluble residue | 10% |
| extender oil | 38% |

The characteristics of the product obtained, determined on test pieces prepared by an injection molding process were as follows:

| | |
|---|---|
| SHORE hardness A | 70 |
| Tensile strength (MPa) | 7.2 |
| Elongation at break (%) | 350 |
| Compression set (10 h at 170° C.) (%) | 55 |

The size of the elastomeric dispersed particles was lower than 10 microns, with at least 50% of the particles having a size lower than 5 microns.

EXAMPLE 9

(comparative test)

Example 8 was repeated, but without using 1,5-difurfuryl-1,4-pentadien-3-one as a vulcanization coadjuvant. The analysis of the composition after cross-linking gave the following results, expressed in % by weight:

| | |
|---|---|
| non cross-linked elastomeric terpolymer | 21% |
| polypropylene as such | 22% |
| residue insoluble in xylene at 135° C. after 5 hours | 14% |
| polypropylene content in the insoluble residue | 1% (on the total) |
| extender oil | 39% |

The composition characteristics were as follows:

| | |
|---|---|
| SHORE hardness A | 64 |
| Tensile strength (MPa) | 3.1 |
| Elongation at break (%) | 250 |
| Compression set (10 h at 170° C.) (%) | 95 |

EXAMPLE 10

(comparative test)

Example 1 was repeated, using, instead of di-furfural aldazine, 0.4% by weight of triallyl cyanurate as a cross-linking co-agent.

The resulting product exhibited the following %-composition:

| | |
|---|---|
| non cross-linked elastomeric copolymer | 8% |
| polypropylene as such | 29% |
| residue insoluble in xylene at 135° C. after 5 hours | 21% |
| polypropylene content in the insoluble residue | 21% (on the total of the composition) |
| extender oil | 37% |

The product characteristics were as follows:

| | |
|---|---|
| SHORE hardness A | 68 |
| Tensile strength (MPa) | 5.5 |
| Elongation at break (%) | 300 |
| Compression set (10 h at 170° C.) (%) | 92 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A process for preparing the plastoelastomeric polyolefinic compositions comprising an intimate mixture of the following components, in the indicated percentage by weight:
   A) 10–50% of non cross-linked polypropylene,
   B) 2–10% of an ethylene/propylene elastomeric non cross-linked copolymer, or of an ethylene/propylene/diene elastomeric non cross-linked terpolymer,
   C) 30–45% of a polymeric product insoluble in xylene at 135° C., comprising polypropylene and ethylene/propylene copolymer or ethylene/propylene/diene termpolymer, and
   D) 5–58% of an extender oil, which comprises the following consecutive steps:
   1) preparing an intimate mixture comprising, in % by weight of the whole mixture:

(a) from 20 to 80% of polypropylene or of a copolymer of propylene with up to 10% by weight of ethylene;
(b) from 80 to 20% of an ethylene/propylene elastomeric copolymer or of an ethylene/-propylene/diene elastomeric terpolymer;
(c) from 0.1 to 10%, referred to the elastomeric copolymer or terpolymer, of an organic peroxide as a vulcanizing agent;
(d) from 5 to 60% referred to the organic peroxide, of at least one compound selected from the group consisting of the following formulae:

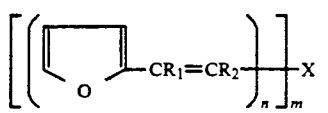
(I)

where: X is a radical of formula: —CHO, —COOH, —CONH$_2$, —CN, —NO$_2$, —COO-CO—, —COOR, —CO—, —CH$_2$COCH$_2$COOR, CH(COOR)$_2$, where R is an aryl containing 6 to 8 carbon atoms or an alkyl containing 1 to 4 carbon atoms, R$_1$, and R$_2$, which are equal to, or different from each other, can be H or C$_1$-C$_3$ alkyl, n=1 or 2, and m=a number equal to the free valence of X;

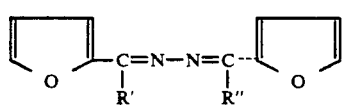
(II)

where R' and R", which are equal to or different from each other, may be hydrogen, or alkyl radicals containing 1 to 4 carbon atoms, or cycloalkyl radicals containing from 5 to 8 carbon atoms;

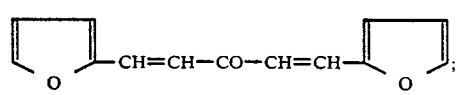
(III)

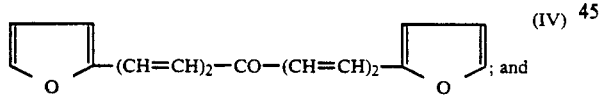
(IV)

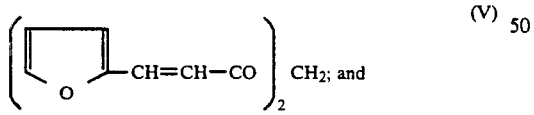
(V)

(e) an amount from 0 to lower than 4%, based on the total polymeric material, of polyethylene;
2) heating the mixture during mixing, or mastication, or while the mixture is subjected to other shearing stresses to a temperature ranging from 160° C. to 240° C. such that melting of polypropylene and cross-linking of about 50-85% by weight of the originally present elastomeric copolymer or terpolymer occurs; and
3) adding to the resulting product, by means of intimate mixing, an extender oil in an amount ranging from 6 to 100 parts by weight of the product.

2. A process for preparing plastoelastomeric polyolefinic compositions comprising an intimate mixture of the following components, in the indicated percentage by weight:
(A) 10-50% of non cross-linked polypropylene,
(B) 2-10% of an ethylene/propylene elastomeric non cross-linked copolymer, or of an ethylene/-propylene/diene elastomeric non cross-linked terpolymer,
(C) 30-45% of a polymeric product insoluble in xylene at 135° C., comprising 5-20% of polypropylene and ethylene/propylene copolymer or ethylene/propylene/diene terpolymer, and
(D) 5-58% of an extender oil, which comprises the following consecutive steps:
1) preparing an intimate mixture comprising, in % by weight of the whole mixture:
(a) from 20 to 80% of polypropylene or of a copolymer of propylene with up to 10% by weight of ethylene;
(b) from 80 to 20% of an ethylene/propylene elastomeric copolymer or of an ethylene/-propylene/diene elastomeric terpolymer;
(c) from 0.1 to 10%, referred to the elastomeric copolymer or terpolymer, of an organic peroxide as a vulcanizing agent;
(d) from 5 to 60% referred to the organic peroxide, of at least one compound selected from the group consisting of the following formulae:

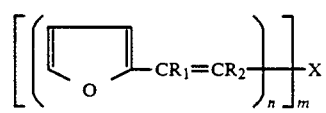
(I)

where: X is a radical of formula: —CHO, —COOH, —CONH$_2$, —CN, —NO$_2$, —COO-CO—, —COOR, —CO—, —CH$_2$COCH$_2$COOR, CH(COOR)$_2$, where R is an aryl containing 6 to 8 carbon atoms or an alkyl containing 1 to 4 carbon atoms, R$_1$, and R$_2$, which are equal to, or different from each other, can be H or C$_1$-C$_3$ alkyl, n=1 or 2, and m=a number equal to the free valence of X;

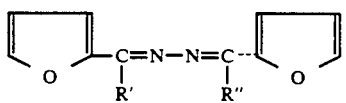
(II)

where R' and R", which are equal to or different from each other may be hydrogen, or alkyl radicals containing 1 to 4 carbon atoms, or cycloalkyl radicals containing from 5 to 8 carbon atoms;

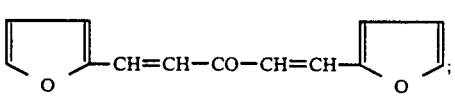
(III)

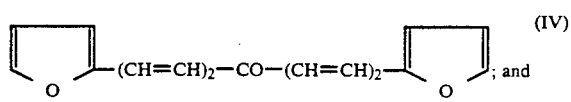
(IV)

-continued

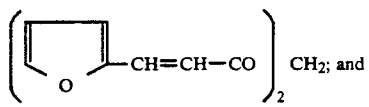

(e) an amount from 0 to lower than 4%, based on the total polymeric material, of polyethylene;

2) heating the mixture during mixing, or mastication, or while it is subjected to other shearing stresses to a temperature ranging from 160° C. to 240° C. such that melting of polypropylene and cross-linking of about 50–85% by weight of the originally present elastomeric copolymer or terpolymer occurs; and 3) adding to the resulting product, by means of intimate mixing, an extender oil in an amount ranging from 6 to 100 parts by weight of the product.

3. The process according to claim 1, wherein the elastomeric copolymer or terpolymer has a molecular weight corresponding to values of $/\eta/$ ranging from 3 to 5 dl/g.

4. The process according to claim 1, wherein the elastomeric copolymer or terpolymer are characterized by the absence, in the macromolecular structure, of head-to-head, tail-to-tail inversions of the propylene unit.

5. The process according to claim 1, wherein the elastomeric copolymer or terpolymer exhibits an average value of product $R_1 \times R_2$ higher than 2 and values of the Mw/Mn ratio equal to at least 6.

* * * * *